Patented Nov. 25, 1941

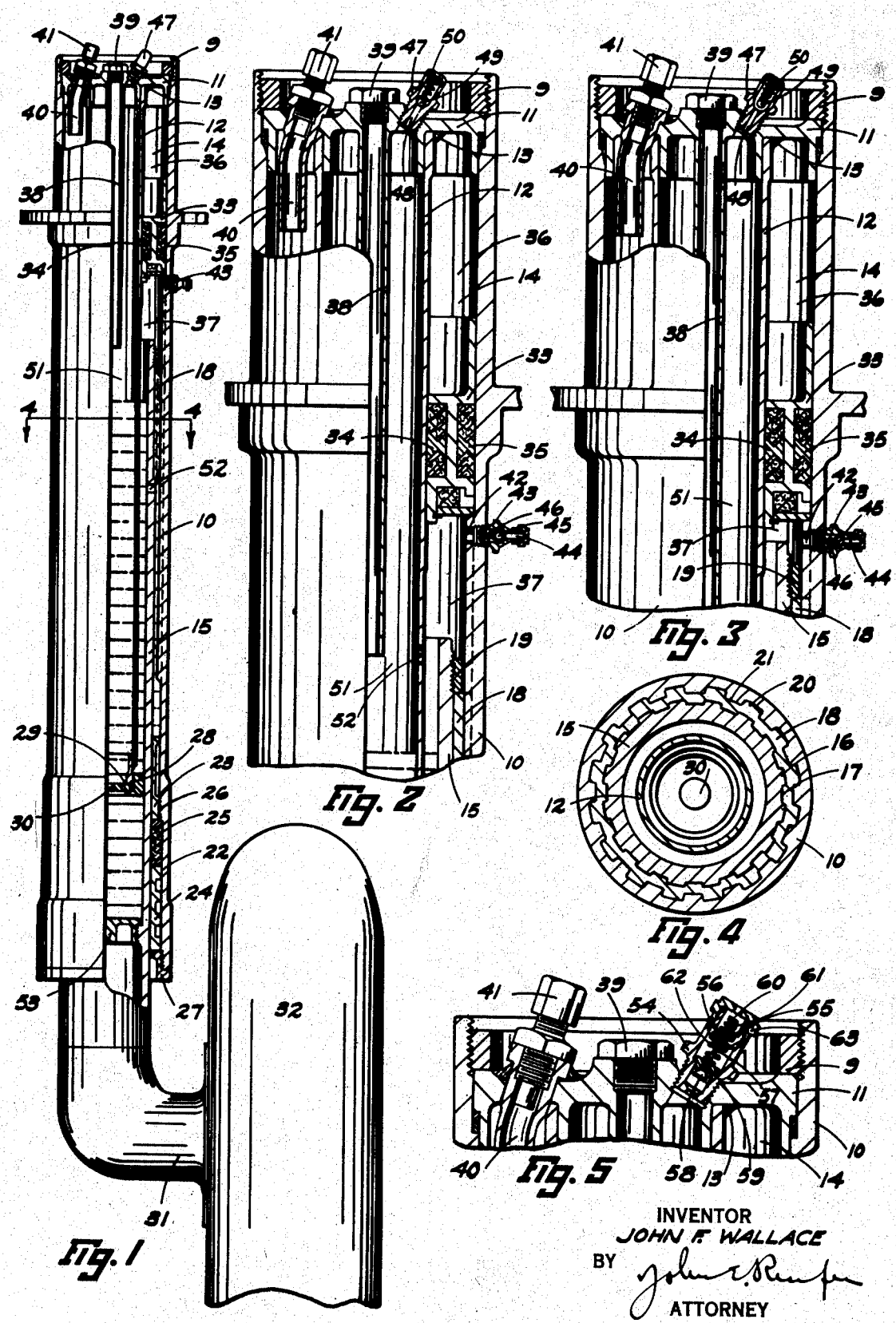

2,263,710

UNITED STATES PATENT OFFICE 2,263,710

SHOCK ABSORBING STRUT

John F. Wallace, University Heights, Ohio, assignor to The Cleveland Pneumatic Tool Company, Cleveland, Ohio, a corporation of Ohio Application August 15, 1940, Serial No. 352,779

1 Claim. (Cl. 267—64)

This invention relates broadly to shock absorbers, but more particularly to shock absorbing struts for aircraft.

One object of this invention is to provide a shock absorbing strut including telescoping cylinders with adequate means enabling intake of atmospheric air into the strut during the extension thereof, thereby preventing vacuum from retarding and possibly preventing full extension of the strut after the take-off of the craft.

Another object of this invention is to provide such shock absorbing struts with adequate means enabling exhaust of air from its telescoping cylinders when that air has been compressed to a predetermined pressure by virtue of the compression stroke of the cylinders, thereby enabling the compression of the strut to be checked by an air cushion but enabling release of this cushion when full compression of the strut is effected by mechanical means preparatory to the retracting of the landing gear.

Other objects and advantages more or less ancillary to the foregoing reside in the specific construction and aggroupment of the elements peculiar to this structure, as will become apparent from a more complete examination of this specification.

In the drawing:

Fig. 1 is a front elevational view, partly in section, of a shock absorbing strut embodying the invention.

Fig. 2 is an enlarged view of the upper end portion of the strut shown in Fig. 1.

Fig. 3 is a view similar to Fig. 2 but illustrating parts in different positions.

Fig. 4 is an enlarged cross sectional view taken in a plane indicated by line 4—4 in Fig. 1.

Fig. 5 is a sectional view of the upper end of the strut illustrating a modification of the invention.

Referring to the drawing, 10 represents an outer or external cylinder closed at its upper end by a cap 11 secured in position by a retaining annular nut 9. Depending from the cap 11 into the cylinder 10, there is a coaxial inner tube 12 secured to the cap 11 by means of a weld 13. The inner tube 12 is of an external diameter smaller than the inner diameter of the cylinder 10 to form therebetween an annular chamber generally designated by 14. Within the chamber 14 is telescopically mounted a wheel carrying member or inner cylinder 15 having its inner end portion externally splined as at 16 to receive the corresponding internal splines 17 of a sleeve 18 mounted thereon and held in position by a nut 19. The sleeve 18 is also provided with external splines 20 meshing with similar splines 21 formed on the inner wall of the cylinder 10 and extending substantially the full length thereof, thereby preventing relative rotation between the cylinders 10 and 15. The inner end of the cylinder 10 is internally enlarged to form a counterbore 22 accommodating sliding bearings 23 and 24 having located between them adequate packing rings 25, the bearing 23 being held in position by a screw threaded connection 26 with the cylinder 10, while the bearing 24 and packing rings 25 are held in position by a retaining nut 27 screwed within the extreme inner end of the cylinder 10.

Mounted on the inner end of the tube 12, there is a piston 28 slidably engaging the inner cylinder 15. This piston includes a cross wall or partition 29 having a central orifice 30, the purpose of which will be explained later.

As shown in Fig. 1, the inner cylinder 15 has its outer end portion bent at right angles to form a wheel axle 31 on which is operatively mounted a landing wheel 32.

Slidably mounted within the upper end portion of the chamber 14, there is a piston 33 including internal and external packing rings 34 and 35 affording fluid tight joints between the two cylinders and dividing the chamber 14 into an upper compartment 36 and a lower compartment 37. The piston 33 has its downward stroke limited by the inner end of the splines 21 and its upward stroke by the cap 11.

Depending centrally partway into the tube 12, there is a filler tube 38 which is carried by the cap 11 and is closed at its upper end by a removable plug 39. Compressed air can be admitted into the compartment 36 through a filler tube 40 extending through the cap 11 and normally closed by an air valve 41.

Extending through the wall of the cylinder 10 and opening into the lower compartment 37 immediately below the piston 33, there is an air inlet port 42 having mounted therein a check valve 43. This valve has a port 44 extending therethrough and controlled by a spring loaded ball 45, the position and tension of the spring 46 being calculated to normally hold the ball 45 in closed position relative to the port 44 but enabling the valve to open upon suction created within the compartment 37.

In the cap 11, there is also mounted a valve 47 having a port 48 extending therethrough and opening within the upper end of the tube 12. This part is controlled by a ball 49 normally held in closed position relative to the port 48 by a small compression spring 50, the position and tension of which is calculated to enable opening of the valve when air in the tube 12 has been compressed to a predetermined pressure.

The compartment 37 is in constant communication with the interior of the tube 12 which also forms a compartment 51 through one or more ports 52 extending through the tube 12, while the inner end of the inner cylinder 15 is closed by a plug 53.

In the modification shown in Fig. 5, the valve 43 has been omitted and the valve 50 replaced by an intake and exhaust valve including a housing 54 also screwed within the cap 11. Within the outer end of this housing there is provided a cup-shaped bushing 55 having an enlarged orifice 56 extending through the bottom thereof through which is free to slide the rod 57 of a poppet valve 58, which valve is seated against a movable seat 59, which itself is seated against the housing 54 as clearly shown in Fig. 5. Between the bottom of the bushing 55 and the head 60 of the rod 57, there is a light compression spring 61, and a heavier compression spring 62 between the bushing 55 and the movable seat 59. The housing 55 is closed by an apertured cap 63 screwed on the bushing 55 which extends from the housing 54.

In practice, the shock absorbing strut, while fully compressed, is partly filled with liquid such as oil until its level reaches the inner end of the filler tube 38. Compressed air is also admitted into the compartment 36 through the filler tube 40 by way of the air valve 41 until the air within that compartment has reached a predetermined pressure which normally acts on the piston 33 to maintain it in the position shown in Fig. 2, that is, at the end of its downward stroke. When landing, the inner cylinder 15 will slide upwardly into the lower compartment 37. In this instance, the compression of the strut is checked by the gradual displacement of the liquid from below the partition 29 to above the partition through the orifice 30. Toward the extreme end of the compression of the strut, the extreme inner end of the inner cylinder 15 will engage the piston 33 for moving this piston upwardly, thereby subjecting the compressed air within the compartment 36 to additional compression which will retard and finally check further compression of the strut.

Upon taking off, that is, when the landing wheel 32 leaves the ground, the weight of the landing wheel as well as that of the inner cylinder 15, will tend to cause the full extension of the strut. Normally, the increase in the volumetric capacity of the compartment 37 resulting from the downward stroke of the inner cylinder 15, would create at least a partial vacuum in the compartment 37, which would tend to prevent full extension of the strut. With the valve 43, when a predetermined vacuum is created within the compartment 37, the ball 45 will move into open position relative to the port 44 by compressing the spring 46 and allow intake of atmospheric air into the compartment 37, thereby breaking the vacuum existing in this compartment and enabling full extension of the strut.

When it is desired to retract the landing gear, the strut is first compressed by adequate mechanism (not shown) pulling the cylinder 15 into the compartment 37 until the inner end of the cylinder 15 engages the piston 33. In this instance, the atmospheric air previously admitted into the compartment 37 through the intake valve 43 will of course be subjected to compression due to a reduction in the volumetric capacity of the compartment 37. Normally this compressed air would prevent the retraction of the strut. With the valve 47, the compressed air formed in the compartment 37 flowing into the compartment 51 of the tube 12 through the ports 52, will act on the ball 49 to compress the spring 50 and enable exhaust of the compressed air through the valve port 48 as shown in Fig. 3. The compression of the spring 50 is calculated to resist the action of the compressed air on the ball 49 until the air in the compartments 37 and 51 has reached a predetermined pressure which is calculated to act as a cushion for normally retarding the compression of the struts upon landing of the craft.

In the modification shown in Fig. 5, upon extension of the strut or more specifically downward movement of the inner cylinder 15 in the compartment 37, the poppet valve 58, when subjected to initial vacuum within the compartment 51 of the tube 12, will move downwardly away from the seat 59 by compressing the relatively light compression spring 61, thereby enabling intake of atmospheric air through the valve into the tube 12 or its compartment 51 and the compartment 37 through the ports 52. Upon compression of the strut, the air in the compartment 37 being compressed due to a reduction in the volumetric capacity of that compartment will flow in the compartment 51 through the ports 52 and act on the poppet valve 58 causing it together with the seat 59 to move away from the housing 54 to enable exhaust of the compressed air through the housing. In this instance, the spring 69 is also calculated to resist action of the compressed air on the seat 59 until it has reached a predetermined pressure.

From the foregoing description, it will be understood that extension of the strut can be affected without resistance such as would normally exist if the vacuum in the compartments 37 and 51 were allowed to take place, and that compression of the strut while partly checked by the atmospheric air compressed within the compartments 37 and 51 due to a reduction in the volumetric capacity of these compartments is nevertheless possible by providing the check valve 47 which automatically allows the compressed air to exhaust from the compartment 51 when the pressure thereof has reached a predetermined maximum.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

In a shock absorbing strut for aircraft, a pair of tubular members one surrounding the other and having a closed upper end, an upper and a lower compartment between said members separated by a slidable piston, compressible fluid within the upper compartment, a landing wheel carrying cylinder slidable in the lower compartment capable of engagement with said piston during certain conditions of operation for compressing said fluid and retarding inward movement of said cylinder relative to said members, a valve controlled port below said piston enabling intake of atmospheric air into said lower compartment during outward movement of said cylinder relative to said members, and means including a valve controlled port through the closed upper end of the inner member enabling exhaust of said air only when subjected to a predetermined pressure resulting from the inward movement of said cylinder.

JOHN F. WALLACE.